US008582820B2

(12) United States Patent
Kane et al.

(10) Patent No.: US 8,582,820 B2
(45) Date of Patent: Nov. 12, 2013

(54) CODED APERTURE CAMERA WITH ADAPTIVE IMAGE PROCESSING

(75) Inventors: Paul James Kane, Rochester, NY (US); Sen Wang, Rochester, NY (US)

(73) Assignee: Apple Inc., Cupertino, CA (US)

(*) Notice: Subject to any disclaimer, the term of this patent is extended or adjusted under 35 U.S.C. 154(b) by 482 days.

(21) Appl. No.: 12/889,818

(22) Filed: Sep. 24, 2010

(65) Prior Publication Data
US 2012/0076362 A1 Mar. 29, 2012

(51) Int. Cl.
*G06K 9/00* (2006.01)
(52) U.S. Cl.
USPC ........................................... 382/106; 382/255
(58) Field of Classification Search
USPC ......... 382/106, 154, 173, 255, 286; 356/4.01, 356/4.04
See application file for complete search history.

(56) References Cited

U.S. PATENT DOCUMENTS

| | | | |
|---|---|---|---|
| 3,708,619 A | 1/1973 | Martin | 178/7.92 |
| 3,971,065 A | 7/1976 | Bayer | 358/41 |
| 4,876,591 A | 10/1989 | Muramatsu | 158/43 |
| 6,011,875 A | 1/2000 | Laben et al. | 382/276 |
| 6,097,835 A | 8/2000 | Lindgren | 382/162 |
| 6,549,288 B1 | 4/2003 | Migdal et al. | 356/603 |
| 7,239,342 B2 | 7/2007 | Kingetsu et al. | 348/208.4 |
| 7,340,099 B2 | 3/2008 | Zhang | 382/191 |
| 7,834,929 B2 | 11/2010 | Okawara | 348/347 |
| 8,017,899 B2 | 9/2011 | Levenets et al. | 250/208.1 |
| 8,305,485 B2 * | 11/2012 | Kane et al. | 348/348 |
| 8,330,852 B2 * | 12/2012 | Kane et al. | 348/362 |
| 8,379,120 B2 * | 2/2013 | Wang et al. | 348/248 |
| 2002/0075990 A1 | 6/2002 | Lanza et al. | 378/2 |
| 2002/0149691 A1 | 10/2002 | Pereira et al. | 348/335 |
| 2005/0030625 A1 | 2/2005 | Cattin-Liebl | 359/560 |
| 2006/0017837 A1 | 1/2006 | Sorek et al. | 348/362 |
| 2006/0093234 A1 | 5/2006 | Silverstein | 382/255 |
| 2006/0157640 A1 | 7/2006 | Perlman et al. | 250/208.1 |
| 2006/0187308 A1 | 8/2006 | Lim et al. | 348/208.4 |
| 2007/0046807 A1 | 3/2007 | Hamilton, Jr. et al. | 348/362 |

(Continued)

FOREIGN PATENT DOCUMENTS

WO  WO 2010/015086 A1  2/2010

OTHER PUBLICATIONS

V.M. Bove, Pictorial Applications for Range Sensing Cameras, SPIE vol. 901, pp. 10-17, 1988.

(Continued)

*Primary Examiner* — Andrew W Johns
(74) *Attorney, Agent, or Firm* — Wong, Cabello, Lutsch, Rutherford & Brucculeri, LLP

(57) ABSTRACT

An image capture device is used to identify object range information, and includes: providing an image capture device, an image sensor, a coded aperture, and a lens; and using the image capture device to capture a digital image of the scene from light passing through the lens and the coded aperture, the scene having a plurality of objects. The method further includes: dividing the digital image into a set of blocks; assigning a point spread function (psf) value to each of the blocks; combining contiguous blocks in accordance with their psf values; producing a set of blur parameters based upon the psf values of the combined blocks and the psf values of the remaining blocks; producing a set of deblurred images based upon the captured image and each of the blur parameters; and using the set of deblurred images to determine the range information for the objects in the scene.

20 Claims, 10 Drawing Sheets

(56) References Cited

U.S. PATENT DOCUMENTS

| | | | |
|---|---|---|---|
| 2007/0223831 A1 | 9/2007 | Mei et al. | |
| 2008/0025627 A1 | 1/2008 | Freeman et al. | 382/255 |
| 2008/0030592 A1 | 2/2008 | Border et al. | 348/218.1 |
| 2008/0100717 A1 | 5/2008 | Kwon | 348/208.99 |
| 2008/0218611 A1 | 9/2008 | Parulski et al. | 348/262 |
| 2008/0218612 A1 | 9/2008 | Border et al. | 348/262 |
| 2008/0219654 A1 | 9/2008 | Border et al. | 396/89 |
| 2008/0240607 A1 | 10/2008 | Sun et al. | 382/275 |
| 2009/0016481 A1 | 1/2009 | Slinger | 378/2 |
| 2009/0020714 A1 | 1/2009 | Slinger | 250/550 |
| 2009/0028451 A1 | 1/2009 | Slinger et al. | 382/233 |
| 2009/0090868 A1 | 4/2009 | Payne | 250/363.06 |
| 2009/0091633 A1 | 4/2009 | Tamaru | 348/208.14 |
| 2010/0034429 A1 | 2/2010 | Drouin et al. | 382/108 |
| 2010/0073518 A1 | 3/2010 | Yeh | 348/231.99 |
| 2010/0110179 A1 | 5/2010 | Zalevsky et al. | 348/135 |
| 2010/0201798 A1 | 8/2010 | Ren et al. | 348/78 |
| 2010/0215219 A1 | 8/2010 | Chang et al. | 382/106 |
| 2010/0220212 A1 | 9/2010 | Perlman et al. | 8/229.1 |
| 2010/0265316 A1 | 10/2010 | Sali et al. | 348/46 |
| 2011/0102642 A1* | 5/2011 | Wang et al. | 348/241 |
| 2011/0267477 A1* | 11/2011 | Kane et al. | 348/207.1 |
| 2011/0267485 A1* | 11/2011 | Kane et al. | 348/222.1 |
| 2011/0267486 A1* | 11/2011 | Kane et al. | 348/222.1 |
| 2011/0267507 A1* | 11/2011 | Kane et al. | 348/241 |
| 2011/0267508 A1* | 11/2011 | Kane et al. | 348/241 |

OTHER PUBLICATIONS

J.W. Goodman, Introduction to Fourier Optics, McGraw-Hill, SanFrancisco, 1968, pp. 113-117.

Veeraraghavan et al, Dappled Photography: Mask Enhanced Cameras for Heterodyned Light Fields and Coded Aperture Refocusing, ACM Transations on Graphics 26 (3), Jul. 2007, paper 69.

Levin, et al, In Image and Depth from a Conventional Camera with a Coded Aperture, ACM Transactions on Graphics 26 (3), Jul. 2007, paper 70.

Hiura and Matsuyama in Depth Measurement by the Multi-Focus Camera, Proceedings of the IEEE Conference on Computer Vision and Pattern Recognition 1998, pp. 953-959.

Slanted-edge MTF for Digital Camera and Scanner Analysis by P.D. Burns, Proc. IS&T 2000 PICS conference, pp. 135-138.

Seales and Cutts in Active Camera Control from Compressed Image Streams, SPIE Proceedings, vol. 2589, 50-57 (1995).

U.S. Appl. No. 12/612,135, filed Nov. 4, 2009, Wang, et al.

A. N. Rajagopalan, et al., "An MRF Model-Based Approach to Simultaneous Recovery of Depth and Restoration from Defocused Images," IEEE Transactions on Pattern Analysis and Machine Intelligence, IEEE Service Center, Los Alamitos, CA, US, vol. 21, No. 7, Jul. 1, 1999, pp. 577-589, XP000832594, ISSN: 0162-8828, DOI: DOI: 1.1109/34.777369, the whole document.

Ben-Ezra, et al., "Motion deblurring using hybrid imaging," Proc. IEEE Conf. on Computer Vision and Pattern Recognition, vol. 1, pp. 657-664, 2003.

Busboom, et al., "Coded Aperture Imaging with Multiple Measurements," Journal of the Optical Society of America: May 1997, 14:5, 1058-1065.

Donatelli et al., "Improved image deblurring with anti-reflective boundary conditions and re-blurring," Inverse Problems, vol. 22, pp. 2035-2053, 2006.

Dr. Arthur Cox, A Survey of Zoom Lenses, SPIE vol. 3129,0277-786x/97. 1997.

Fergus et al., "Removing camera shake from a single photograph," ACM Transactions on Graphics, vol. 25, pp. 787-794, 2006.

International Search Report and Written Opinion received in corresponding PCT Application No. PCT/US2011/034039, dated Jun. 24, 2011.

L. B. Lucy, "An iterative technique for the rectification of observed distributions," Astronomical Journal, vol. 79, pp. 745-754, 1974.

Levin et al., "Understanding and evaluating blind deconvolution algorithms," Proc. IEEE Conf. on Computer Vision and Pattern Recognition, 2009.

Liu, et al., "Simultaneous image formation and motion blur restoration via multiple capture," Proc. International Conference Acoustics, Speech, Signal Processing, pp. 1841-1844, 2001.

Raskar, et al., "Coded exposure photography: motion deblurring using fluttered shutter," ACM Transactions on Graphics, Vol. 25, pp. 795-804, 2006.

Rav-Acha, et al., "Two motion-blurred images are better than one," Pattern Recognition Letters, vol. 36, pp. 211-217, 2005.

S. K. Nayar, et al., "Real Time Focus Range Sensor," IEEE Transactions of Pattern Analysis and Machine Intelligence, vol. 18, No. 12, Dec. 1996, p. 1186-1198.

Sazbon, D., et al., "Qualitative Real-Time Range Extraction for Preplanned Scene Partitioning Using Laser Beam Coding," Apr. 29, 2005, Pattern Recognition Letters, vol. 26, 2005.

Shan et al., "High-quality motion deblurring from a single image," ACM Transactions on Graphics, vol. 27 pp. 1-10, 2008.

W. H. Richardson, "Bayesian-based iterative method of image restoration," Journal of the Optical Society of America, vol. 62, pp. 55-59, 1972.

Yuan et al., "Image deblurring with blurred/noisy image pairs," ACM Transactions on Graphics, vol. 26, Iss. 3, 2007.

Yuan et al., "Progressive inter-scale and intra-scale non-blind image deconvolution," ACM Transactions on Graphics, vol. 27, Iss. 3, 2008.

* cited by examiner

CODED APERTURE CAMERA WITH ADAPTIVE IMAGE PROCESSING

CROSS REFERENCE TO RELATED APPLICATIONS

Reference is made to commonly assigned, co-pending U.S. patent application Ser. No. 12/612,135, filed Nov. 4, 2009, entitled "Image deblurring using a combined differential image", by Sen Wang, et al, co-pending U.S. patent application Ser. No. 12/770,810, filed Apr. 30, 2010, entitled "Range measurement using coded aperture", by Paul J. Kane, et al, co-pending U.S. patent application Ser. No. 12/770,822, filed Apr. 30, 2010 entitled "Range measurement using multiple coded apertures", by Paul J. Kane, et al, co-pending U.S. patent application Ser. No. 12/770,830, filed Apr. 30, 2010 entitled Range measurement using a zoom camera, by Paul J. Kane, et al, co-pending U.S. patent application Ser. No. 12/770,894, filed Apr. 30, 2010, entitled Digital camera with coded aperture rangefinder, by Paul J. Kane, et al, and co-pending U.S. patent application Ser. No. 12/770,919, filed Apr. 30, 2010, entitled "Range measurement using symmetric coded apertures", by Paul J. Kane, et al the disclosures of which are all incorporated herein by reference.

FIELD OF THE INVENTION

The present invention relates to an image capture device that is capable of determining range information for objects in a scene, and in particular a capture device that uses a coded aperture and computational algorithms to efficiently determine the range information.

BACKGROUND OF THE INVENTION

Optical imaging systems are designed to create a focused image of scene objects over a specified range of distances. The image is in sharpest focus in a two dimensional (2D) plane in space, called the focal or image plane. From geometrical optics, a perfect focal relationship between a scene object and the image plane exists only for pairs of object and image distances that obey the thin lens equation:

$$\frac{1}{f} = \frac{1}{s} + \frac{1}{s'} \quad (1)$$

where f is the focal length of the lens, s is the distance from the object to the lens, and s' is the distance from the lens to the image plane. This equation holds for a single thin lens, but it is well known that thick lenses, compound lenses and more complex optical systems are modeled as a single thin lens with an effective focal length f. Alternatively, complex systems can be modeled using the construct of principal planes, with the object and image distances s, s' measured from these planes and using the effective focal length in the above equation, hereafter referred to as the lens equation.

It is also known that once a system is focused on an object at distance $s_1$, in general only objects at this distance are in sharp focus at the corresponding image plane located at distance $s_1'$. An object at a different distance $s_2$ produces its sharpest image at the corresponding image distance $s_2'$, determined by the lens equation. If the system is focused at $s_1$, an object at $s_2$ produces a defocused, blurred image at the image plane located at $s_1'$. The degree of blur depends on the difference between the two object distances, $s_1$ and $s_2$, the focal length f of the lens, and the aperture of the lens as measured by the f-number, denoted f/#. For example, FIG. 1 shows a single lens 10 of focal length f and clear aperture of diameter D. The on-axis point $P_1$ of an object located at distance $s_1$ is imaged at point $P_1'$ at distance $s_1'$ from the lens. The on-axis point $P_2$ of an object located at distance $s_2$ is imaged at point $P_2'$ at distance $s_2'$ from the lens. Tracing rays from these object points, axial rays 20 and 22 converge on image point $P_1'$, while axial rays 24 and 26 converge on image point $P_2'$, then intercept the image plane of $P_1'$ where they are separated by a distance d. In an optical system with circular symmetry, the distribution of rays emanating from $P_2$ over all directions results in a blur circle of diameter d at the image plane of $P_1'$.

As on axis point $P_1$ moves farther from the lens, tending towards infinity, it is clear from the lens equation that $s'_1=f$. This leads to the usual definition of the f-number as $f/\#=f/D$. At finite distances, the working f-number can be defined as $(f/\#)_w=f/s'_1$. In either case, it is clear that the f-number is an angular measure of the cone of light reaching the image plane, which in turn is related to the diameter of the blur circle d. In fact, it is known that $$d = \frac{f}{(f/\#)s'_2}|s'_2 - s'_1|. \quad (2)$$

Given that the focal length f and f-number of a lens or optical system is accurately measured, and given that the diameter of the blur circle d is measured for various objects in a two dimensional image plane, in principle one can obtain depth information for objects in the scene by inverting the above blur circle equation, and applying the lens equation to relate the object and image distances. Unfortunately, such an approach is limited by the assumptions of geometrical optics. It predicts that the out-of-focus image of each object point is a uniform circular disk. In practice, diffraction effects, combined with lens aberrations, lead to a more complicated light distribution that is more accurately characterized by a point spread function (psf), a 2D function that specifies the intensity of the light in the image plane due to a point light source at a corresponding location in the object plane. Much attention has been devoted to the problems of measuring and reversing the effects of the psf on images captured from scenes containing objects spread over a variety of distances from the camera.

For example, Bove (V. M. Bove, *Pictorial Applications for Range Sensing Cameras*, SPIE vol. 901, pp. 10-17, 1988) models the defocusing process as a convolution of the image intensities with a depth-dependent psf:

$$i_{def}(x,y)=i(x,y)*h(x,y,z), \quad (3)$$

where $i_{def}(x,y)$ is the defocused image, $i(x,y)$ is the in-focus image, $h(x,y,z)$ is the depth-dependent psf and * denotes convolution. In the spatial frequency domain, this is written:

$$I_{def}(V_x,V_y)=I(V_x,V_y)H(V_x,V_y,z), \quad (4)$$

where $I_{def}(V_x,V_y)$ is the Fourier transform of the defocused image, $I(V_x, V_y)$ is the Fourier transform of the in-focus image, and $H(V_x,V_y,z)$ is the Fourier transform of the depth-dependent psf. Bove assumes that the psf is circularly symmetric, i.e. $h(x,y,z)=h(r,z)$ and $H(V_x,V_y,z)=H(\rho,z)$, where r and $\rho$ are radii in the spatial and spatial frequency domains, respectively. In Bove's method of extracting depth information from defocus, two images are captured, one with a small camera aperture (long depth of focus) and one with a large camera aperture (small depth of focus). The Discrete Fourier Transform (DFT) is applied to corresponding blocks of pixels in the two images, followed by a radial average of the resulting power spectra within each block. Then the radially averaged power spectra of the long and short depth of field (DOF) images are used to compute an estimate for H(ρ, z) at corresponding blocks. This assumes that each block represents a scene element at a different distance z from the camera, and therefore the average value of the spectrum is computed at a series of radial distances from the origin in frequency space, over the 360 degree angle. The system is calibrated using a scene containing objects at known distances $[z_1, z_2, \ldots z_n]$ to characterize H(ρ, z), which then is then taken as an estimate of the rotationally-symmetric frequency spectrum of the spatially varying psf. This spectrum is then applied in a regression equation to solve for the local blur circle diameter. A regression of the blur circle diameter vs. distance z then leads to a depth or range map for the image, with a resolution corresponding to the size of the blocks chosen for the DFT. Although this method applies knowledge of the measured psf, in the end it relies on a single parameter, the blur circle diameter, to characterize the depth of objects in the scene.

Other methods which infer depth from defocus seek to control the behavior of the psf as a function of defocus, i.e. the behavior of h(x,y,z) as a function of z, in a predictable way. By producing a controlled depth-dependent blurring function, this information is used to deblur the image and infer the depth of scene objects based on the results of the deblurring operations. There are two main parts to this problem: the control of the psf behavior and deblurring of the image, given the psf as a function of defocus.

The psf behavior is controlled by placing a mask into the optical system, typically at the plane of the aperture stop. For example, FIG. 2 shows a schematic of an optical system from the prior art with two lenses 30 and 34, and a binary transmittance mask 32, including an array of holes, placed in between. In most cases, the mask is the element in the system that limits the bundle of light rays that propagate from an axial object point and is therefore, by definition, the aperture stop. If the lenses are reasonably free from aberrations, the mask, combined with diffraction effects, will largely determine the psf and OTF (see J. W. Goodman, *Introduction to Fourier Optics*, McGraw-Hill, San Francisco, 1968, pp. 113-117). This observation is the working principle behind the encoded blur or coded aperture methods. In one example of the prior art, Veeraraghavan et. al. (*Dappled Photography: Mask Enhanced Cameras for Heterodyned Light Fields and Coded Aperture Refocusing*, ACM Transactions on Graphics 26 (3), July 2007, paper 69) demonstrate the use of a defocus psf which is approximately a scaled image of the aperture mask, a valid assumption for large amounts of defocus, to obtain depth information by deblurring. This requires solving the deconvolution problem, i.e. inverting Eq. (3) to obtain h(x,y, z) for the relevant values of z. In principle, it is easier to invert the spatial frequency domain counterpart of Eq. (3), i.e. Eq. (4), which is possible at frequencies for which $H(v_x,v_y,z)$ is nonzero.

In practice, finding a unique solution for deconvolution is well known as a challenging problem. Veeraraghavan et. al. solves the problem by first assuming the scene is composed of discrete depth layers, and then forming an estimate of the number of layers in the scene. Then, the scale of the psf is estimated for each layer separately, using the model $$h(x,y,z)=m(k(z)x/w,k(z)y/w) \quad (5)$$

where m(x,y) is the mask transmittance function, k(z) is the number of pixels in the psf at depth z, and w is the number of cells in the 2D mask. The authors apply a model for the distribution of image gradients, along with Eq. (5) for the psf, to deconvolve the entire image once for each assumed depth layer in the scene. The results of the deconvolutions are desirable only for those psfs whose scale they match, thereby indicating the corresponding depth of the region. These results are limited in scope to systems behaving according to the mask scaling model of Eq. (5), and masks composed of uniform, square cells.

Levin et. al. in *Image and Depth from a Conventional Camera with a Coded Aperture*, ACM Transactions on Graphics 26 (3), July 2007, paper 70) follow a similar approach to Veeraraghavan, however, Levin et. al. relies on direct photography of a test pattern at a series of defocused image planes, to infer the psf as a function of defocus. Also, Levin et. al. investigated a number of different mask designs in an attempt to arrive at an optimum coded aperture. They assume a Gaussian distribution of sparse image gradients, along with a Gaussian noise model, in their deconvolution algorithm. Therefore, the optimized coded aperture solution is dependent on assumptions made in the deconvolution algorithm.

The solutions proposed by both Veeraraghavan and Levin have the feature that they proceed by performing a sequence of deconvolutions with a single kernel over the entire image area, followed by subsequent image processing to combine the results into a depth map.

Hiura and Matsuyama in *Depth Measurement by the Multi-Focus Camera*, Proceedings of the IEEE Conference on Computer Vision and Pattern Recognition 1998, pp. 953-959, disclose digital camera-based methods for depth measurement using identification of edge points and coded aperture techniques. The coded aperture techniques employ Fourier or deconvolution analysis. In all cases, the methods employed require multiple digital image captures by the camera sensor at different focal planes.

SUMMARY OF THE INVENTION

In accordance with the present invention, there is provided a method of using an image capture device to identify range information for objects in a scene, comprising:

a) providing an image capture device having an image sensor, a coded aperture, and a lens;

b) using the image capture device to capture a digital image of the scene on the image sensor from light passing through the lens and the coded aperture, the scene having a plurality of objects;

c) dividing the digital image into a set of blocks;

d) assigning a point spread function (psf) value to each of the blocks; e) combining contiguous blocks in accordance with their psf values;

f) producing a set of blur parameters based upon the psf values of the combined blocks and the psf values of the remaining blocks;

g) producing a set of deblurred images based upon the captured image and each of the blur parameters; and h) using the set of deblurred images to determine the range information for the objects in the scene.

It is a feature of the present invention that depth information is derived from captured digital images by detecting image blocks of similar point spread function value in an initial estimate and grouping these blocks together for further refinement and assignment of range values to scene objects. Using this method, improved range values are obtained and processing time and complexity is reduced.

DETAILED DESCRIPTION OF THE INVENTION

In the following description, some arrangements of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein are selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the arrangements described herein. References to "a particular arrangement" and the like refer to features that are present in at least one arrangement of the invention. Separate references to "an arrangement" or "particular arrangements" or the like do not necessarily refer to the same arrangement or arrangements; however, such arrangements are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
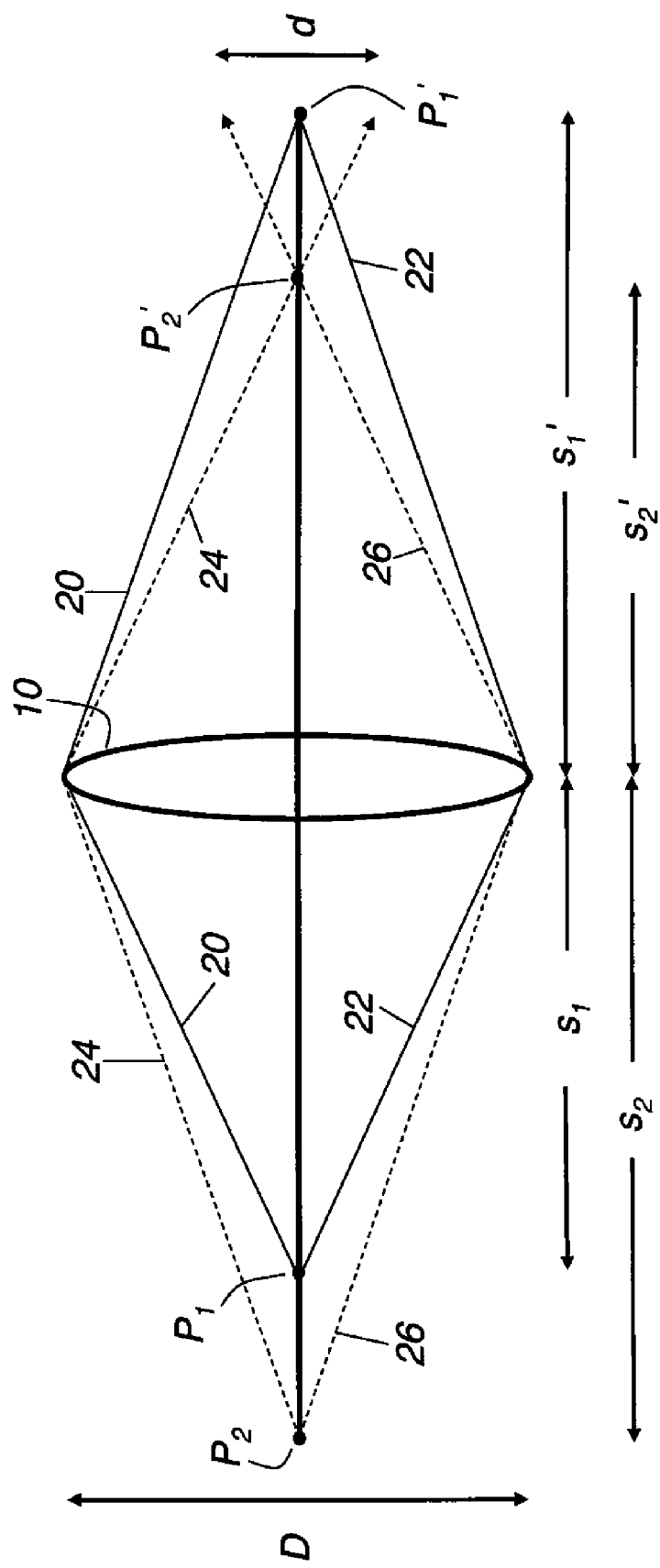
FIG. 1 is a schematic of a single lens optical system as known in the prior art.
Figure 2:
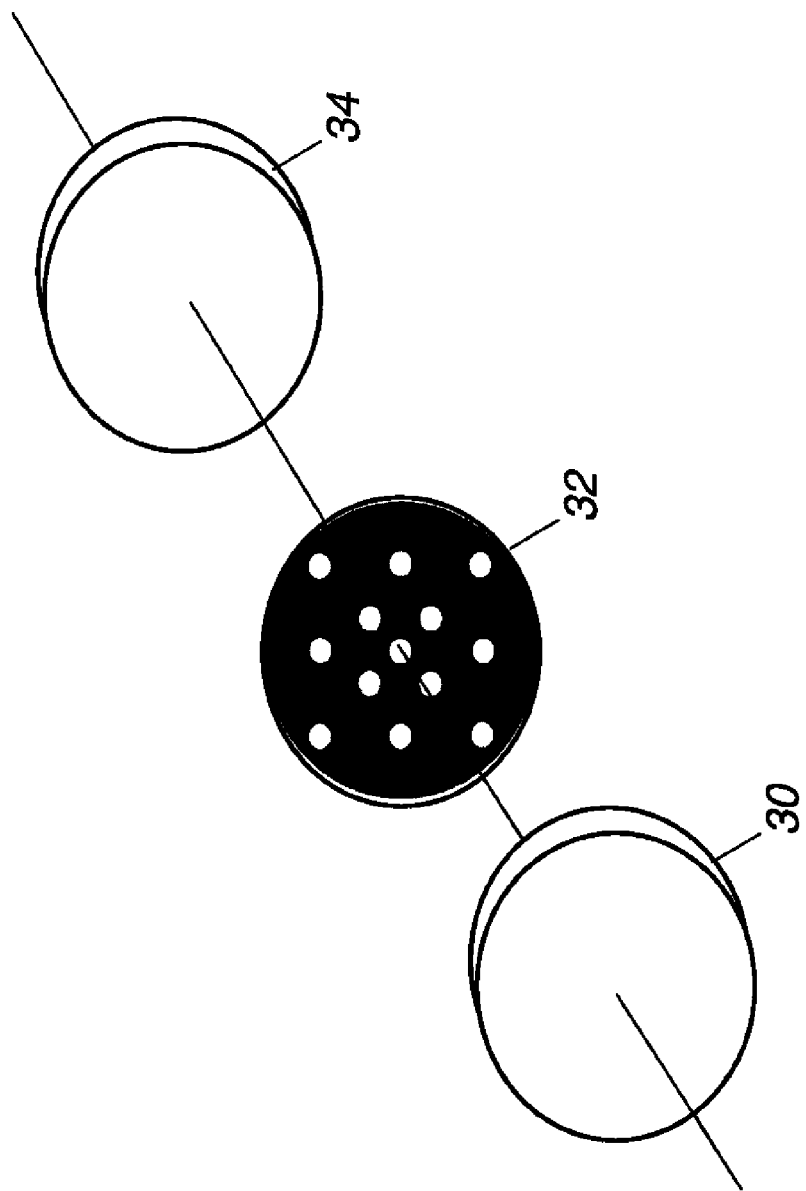
FIG. 2 is a schematic of an optical system with a coded aperture mask as known in the prior art.
Figure 3:
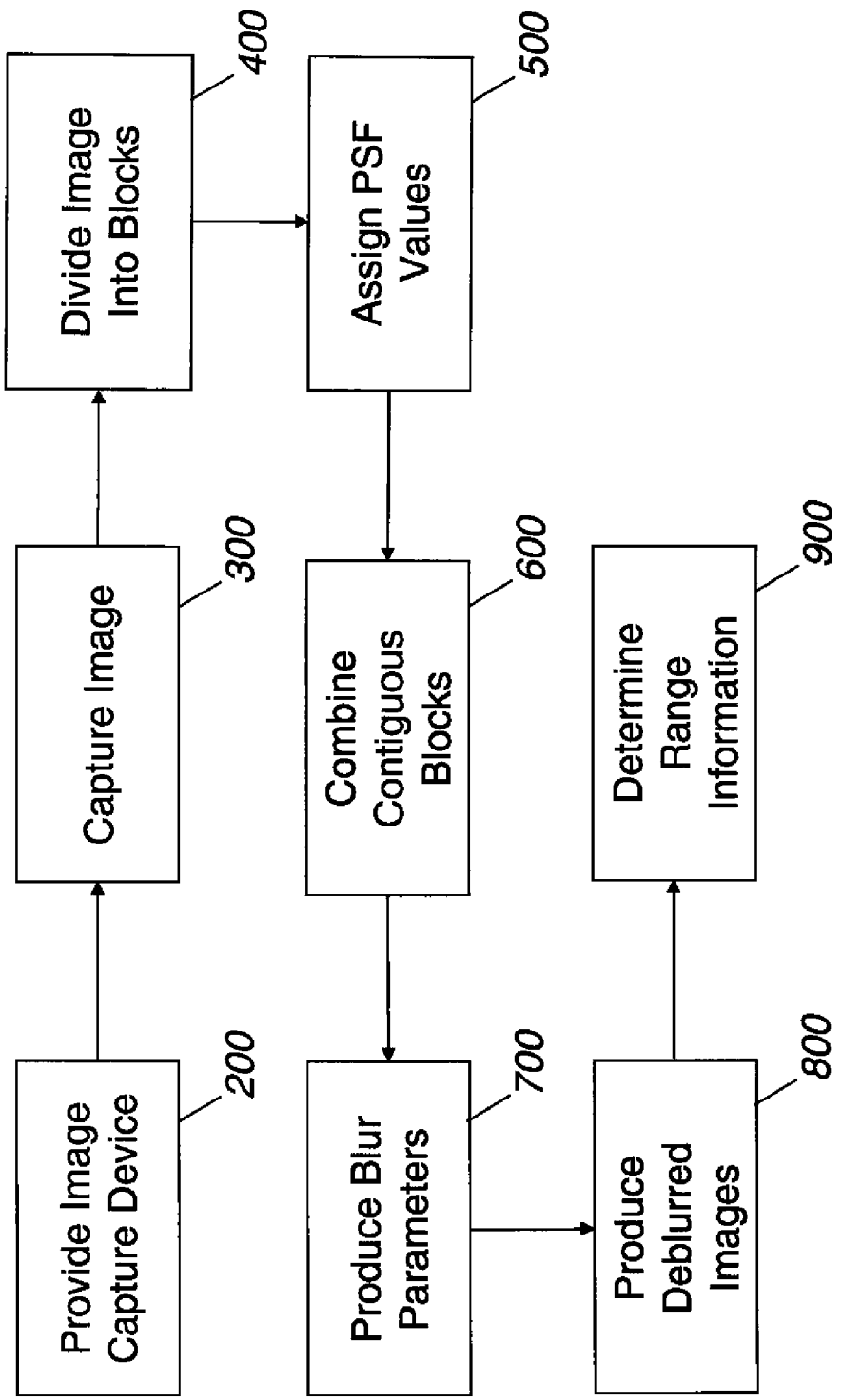
FIG. 3 is a flow chart showing the steps of a method of using an image capture device to identify range information for objects in a scene according to one arrangement of the present invention.

FIG. 3 is a flow chart showing the steps of a method of using an image capture device to identify range information for objects in a scene according to one arrangement of the present invention. The method includes the steps of: providing an image capture device 200 having an image sensor, a coded aperture, and a lens; capturing an image 300 of the scene having a plurality of objects; dividing the image 400 into a set of blocks; assigning a point spread function (psf) value 500 to each of the blocks; combining contiguous blocks 600 in accordance with their psf values; producing a set of blur parameters 700 based upon the psf values of the combined blocks and the psf values of the remaining blocks; producing a set of deblurred images 800 based upon the captured image and each of the blur parameters from the stored set; and using the set of deblurred images to determine the range information 900 for objects in the scene. The method is practiced by the processor 1050 shown in FIG. 10.

Figure 4:
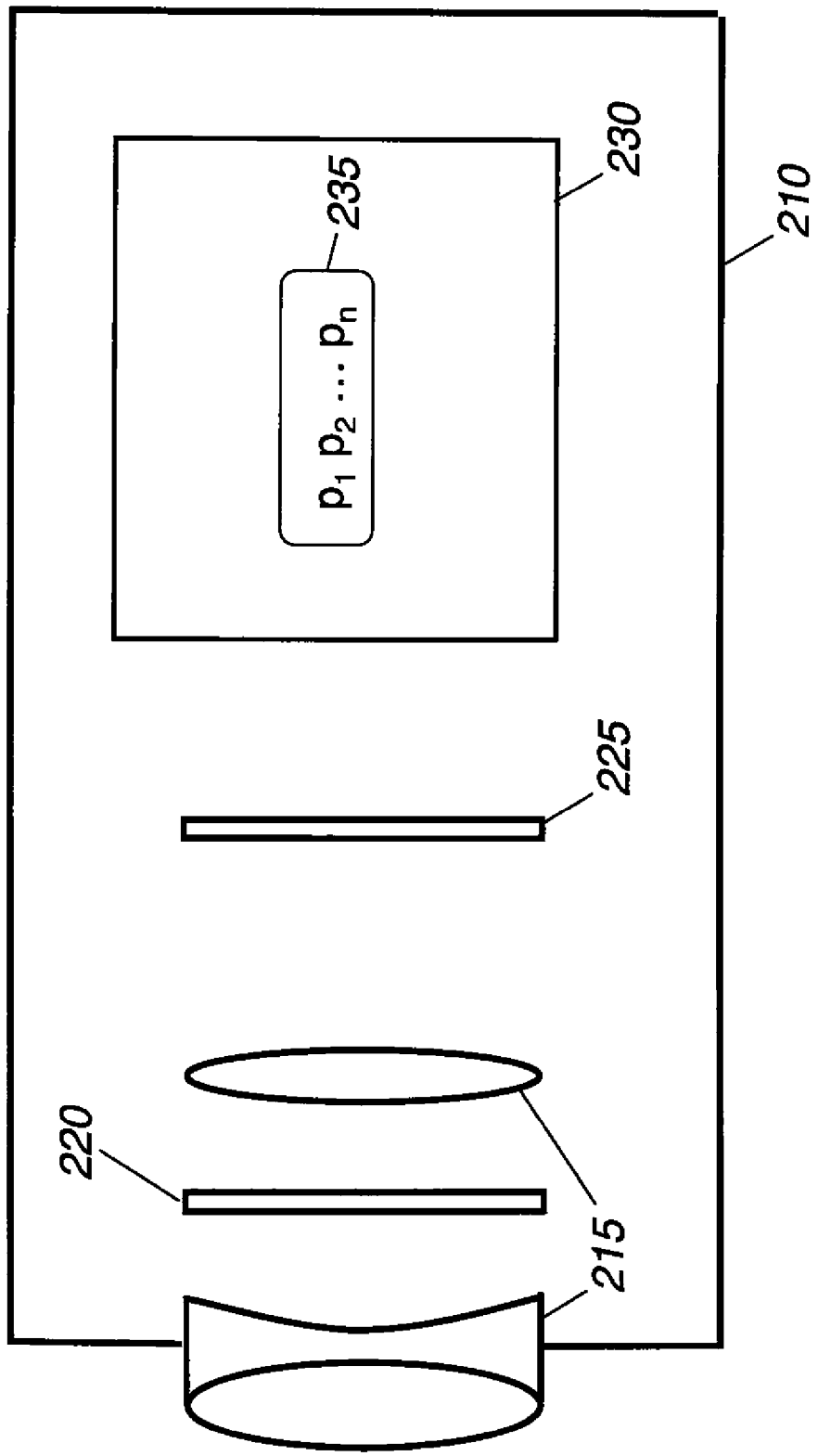
FIG. 4 is a schematic of an image capture device according to one arrangement of the present invention.

An image capture device includes one or more image capture devices that implement the methods of the various arrangements of the present invention, including the example image capture devices described herein. The phrases "image capture device" or "capture device" are intended to include any device including a lens which forms a focused image of a scene at an image plane, wherein an electronic image sensor is located at the image plane for the purposes of recording and digitizing the image, and which further includes a coded aperture or mask located between the scene or object plane and the image plane. These include a digital camera, cellular phone, digital video camera, surveillance camera, web camera, television camera, multimedia device, or any other device for recording images. FIG. 4 shows a schematic of one such capture device according to one arrangement of the present invention. The capture device 210 includes a lens 215, shown here as a compound lens including multiple elements, a coded aperture 220, and an electronic sensor array 225. The coded aperture 220 can be located at the aperture stop of the optical system, or one of the images of the aperture stop, which are known in the art as the entrance and exit pupils. In some arrangements, the coded aperture 220 is placed in between elements of a compound lens 215, as illustrated in FIG. 4, depending on the location of the aperture stop. The coded aperture 220 is of the light absorbing type, so as to alter only the amplitude distribution across the optical wavefronts incident upon it, or the phase type, so as to alter only the phase delay across the optical wavefronts incident upon it, or of mixed type, so as to alter both the amplitude and phase. As shown in FIG. 4, in some arrangements the capture device 210 also includes a memory 230 containing measured psf data 235 that are used in the processing of captured images.

Returning to FIG. 3, the step of capturing an image of the scene 300 includes capturing one image of the scene or two or more images of the scene in a digital image sequence, also known in the art as a motion or video sequence. In this way the method includes the ability to identify range information for one or more moving objects in a scene. This is accomplished by determining range information 900 for each image in the sequence, or by determining range information 900 for some subset of images in the sequence. In some arrangements, a subset of images in the sequence is used to determine range information 900 for one or more moving objects in the scene, as long as the time interval between the images chosen is sufficiently small to resolve significant changes in the depth or z-direction. That is, this will be a function of the objects' speed in the z-direction and the original image capture interval or frame rate. In other arrangements, the determination of range information for one or more moving objects in the scene is used to identify stationary and moving objects in the scene. This is especially advantageous if the moving objects have a z-component to their motion vector, i.e. their depth changes with time, or image frame. Stationary objects are identified as those objects for which the computed range values are unchanged with time, after accounting for motion of the camera, whereas moving objects have range values that change with time. In yet another arrangement, the range information associated with moving objects is used by an image capture device to track such objects.

Figure 5:
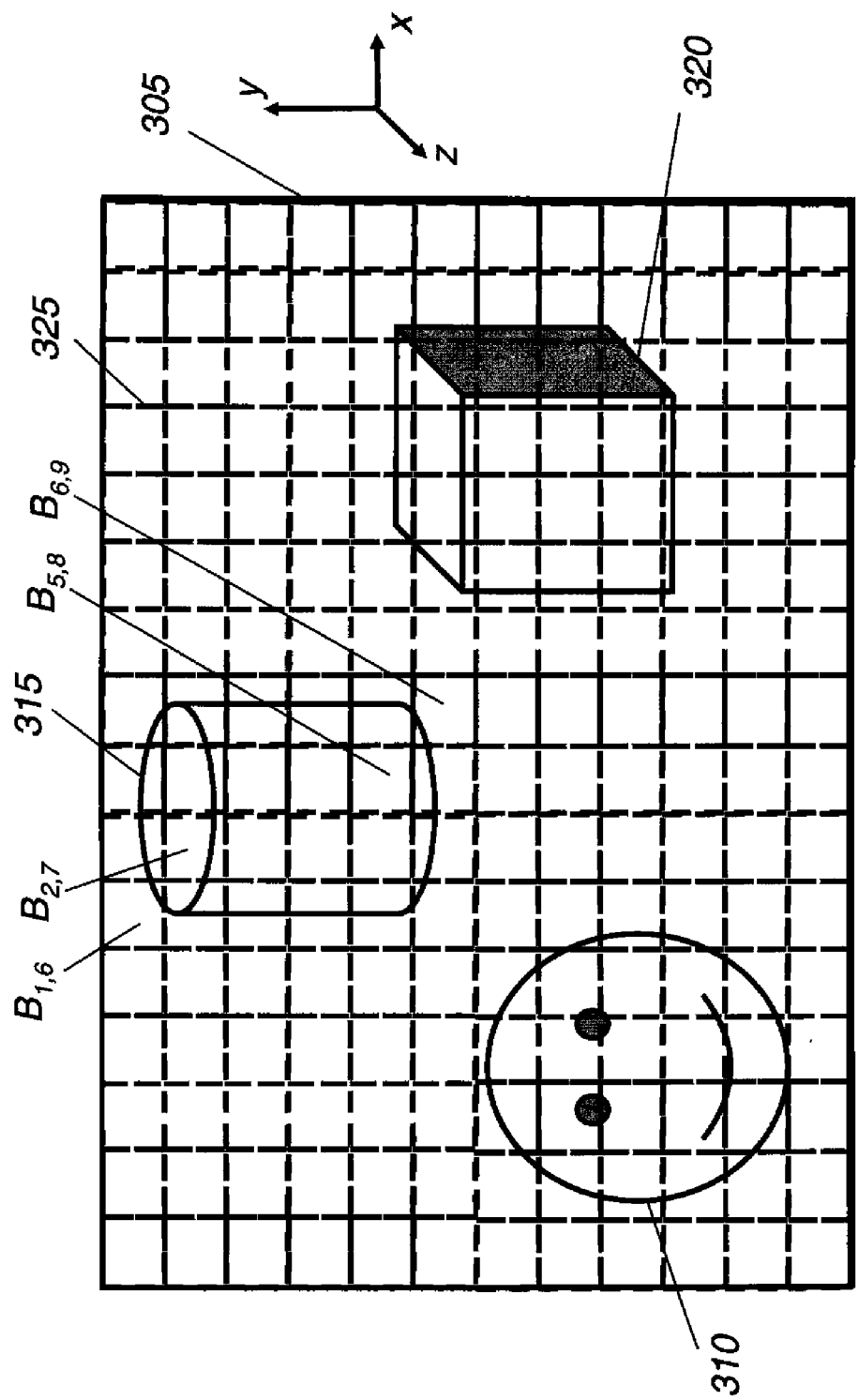
FIG. 5 is a schematic illustrating the division of the image into a set of blocks according to one arrangement of the present invention.

The step of dividing the image into a set of blocks 400 is illustrated in FIG. 5, which shows an image 305 composed of scene objects 310, 315 and 320. The scene objects 310, 315 and 320 have been chosen for illustrative purposes, and the scene can contain other objects in the background, not shown. The step of dividing the image into a set of blocks includes defining a matrix of image elements that are smaller than the scene objects of interest but larger than a pixel. The term blocks is used to refer to processing elements, and does not require that the corresponding physical footprint of the image elements be rectangular or square. The blocks shown in FIG. 5 are square, however blocks of rectangular shape, other polygons, or non-polygon shapes are possible and within the scope of the invention. In a preferred arrangement, the blocks are uniform in size and shape across the image, although this is not required. In the example shown in FIG. 5, square blocks are arranged in a rectangular matrix 325 of rows and columns, wherein each block is identified by a two dimensional matrix element $B_{j,k}$, where j is the row index and k is the column index. It is clear that objects in the scene are fully or partially covered by certain image blocks around their perimeters. For example, blocks $B_{2,7}$ through $B_{5,8}$ fully overlay scene object 315, while the other blocks within the area bounded by the series of blocks from $B_{1,6}$ through $B_{6,9}$ partially overlay scene object 315.

The step of assigning a psf value for each of the blocks 500 in the image is based on the following principles. It is assumed, as explained in the Background, that the effect of defocus on the image of a scene object that is located out of the plane of focus is modeled in the image plane by a depth-dependent psf h(x,y,z). It is further assumed that the depth variations within the area of a particular scene object are minor compared to the depth differences between scene objects, so that the former is neglected. Referring to FIG. 5, the psf over the area of scene object 310 is described by $h(x,y,z_1)$, the psf over the area of scene object 315 by $h(x,y,z_2)$, and the psf over the area of scene object 320 by $h(x,y,z_3)$, respectively, where $z_1$, $z_2$ and $z_3$ are the distances from the camera to the respective scene objects.

Figure 6:
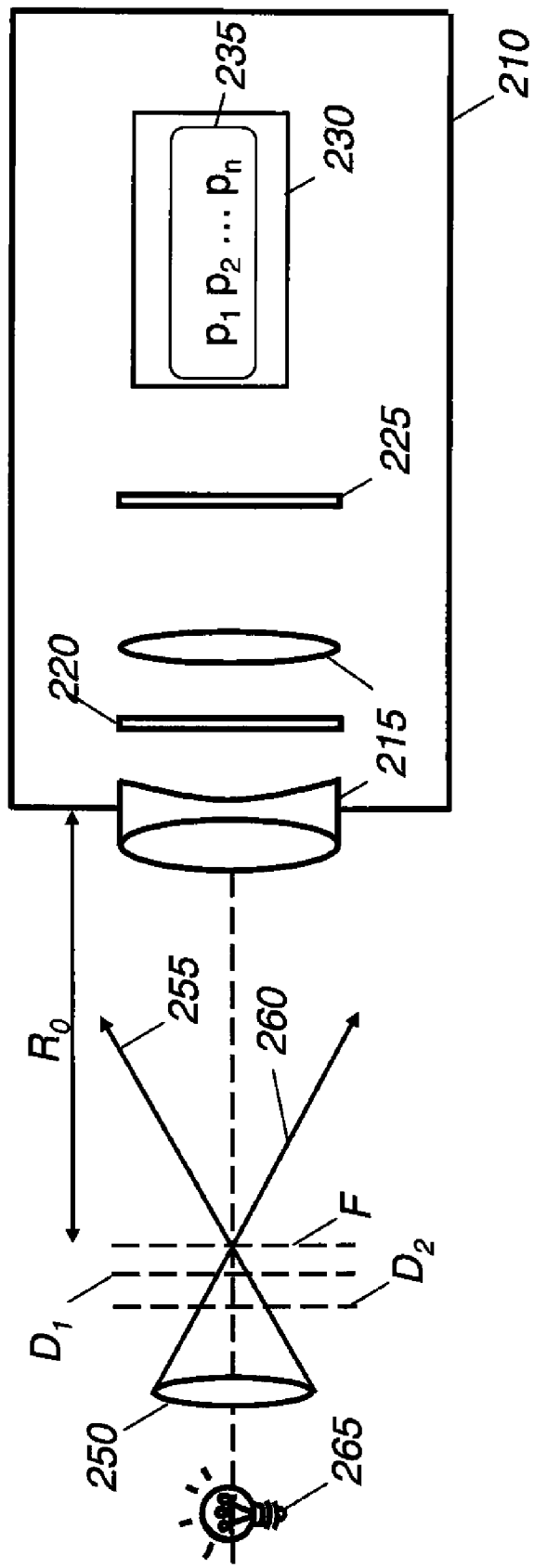
FIG. 6 is a schematic illustrating one arrangement for characterizing the point spread function of the image capture device according to the present invention.

Since the camera contains a coded aperture, to a good approximation if it is assumed that the psf resembles a scaled version of the coded aperture mask transmittance function. In any case, the psf as a function of defocus is measured under controlled conditions prior to image capture. FIG. 6 is a schematic of one arrangement for measuring the psf for one object distance and a series of defocus distances in accord with the present invention. A simulated point source includes a light source 265 focused by condenser optics 250 at a point on the optical axis intersected by a focal plane F, coinciding with the plane of focus of the image capture device 210, located at object distance $R_0$ from the image capture device. The light rays 255 and 260 passing through the point of focus appear to emanate from a point source located on the optical axis at distance $R_0$ from the camera. Thus, the image of this light captured by the image capture device 210 is a record of the image capture device 210 psf at object distance $R_0$. The defocused psf for objects at other distances from the image capture device 210 is captured by moving the light source 265 and condenser lens 250 (in this example, to the left) together so as to move the location of the effective point source to other planes, for example $D_1$ and $D_2$, while maintaining the image capture device 210 focus position at plane F. The distances (or range data) from the image capture device 210 to planes F, $D_1$ and $D_2$ are then recorded along with the psf images to complete the set of calibration data. Other methods of psf measurement known in the art can be used. For example, the simulated point light source 265 is replaced by a test target of known spatial frequency content, and the resulting image is analyzed to extract the spatial frequency response of the camera system and infer the psf. The characterization of the psf is performed for a series of discrete object focus and focal range or depth positions. The depth resolution of the method is determined by the number of depth positions characterized.

The step of assigning a psf value to each of the blocks 500 in the image includes analyzing the image content to determine which of the measured psfs matches the defocus present in each block of the captured image. Before this is done, an initial psf estimate is formed. There are a variety of methods available for accomplishing this task. In one arrangement, each block is analyzed for edge content, using an edge detector such as the Sobel, Canny or Prewitt methods known in the art. Once edges are located, a psf estimate is derived which, when convolved with a perfect edge profile, matches the edge profile in the captured image. The psf estimate is derived by Fourier Transformation of the Spatial Frequency Response, which in turn is computed from the edge profile using methods known in the art. One such method is outlined in *Slanted-Edge MTF for Digital Camera and Scanner Analysis* by P. D. Burns, Proc. IS&T 2000 PICS Conference, pp. 135-138. Several one-dimensional edge profile analyses, oriented in different directions, yield slices through the two-dimensional psf, in accordance with the Projection-slice Theorem (*The Fourier Transform and Its Applications,* $3^{rd}$ ed. R. Bracewell, McGraw-Hill, Boston, 2000) From the series of slices, the full 2D psf estimate is constructed. This psf is then compared to the measured psfs, which in some arrangements are stored in the camera memory 230, and the closest matching psf becomes the psf estimate for that block.

In another arrangement, a coded aperture having circular symmetry is used, which results in the psf having circular symmetry. In this case, a single edge at any orientation is sufficient to infer the two-dimensional psf.

In yet another arrangement, each block is analyzed using a frequency-content or sharpness metric. Sharpness metrics are described by Seales and Cutts in *Active Camera Control from Compressed Image Streams*, SPIE Proceedings vol. 2589, 50-57 (1995). In that reference, a sharpness metric is computed from the Discrete Cosine Transform coefficients of an image area. The metric obtained in a particular block is compared to a table of focus metrics previously computed over a set of representative images, at the same series of defocus positions used in the calibration of the camera, using the same tabulated psfs. The closest match to the tabulated focus metrics then yields the associated psf, which becomes the psf estimate for that block. In other arrangements, sharpness metrics are computed from Fourier Transform coefficients, or coefficients from other mathematical transforms, and a similar analysis performed.

Once the psf estimates for each block are obtained, the final value for the psf in a particular block is assigned by comparison to the measured values obtained at the relevant object and defocus distances. Although the psf is a continuous function of the depth z, as explained previously, the measurement of the psf is performed for a series of discrete object focus and focal range, or depth positions. A psf estimate $\hat{h}_k(x,y)$ associated with a particular block of index k is very close to a value of the depth-dependent psf, $h(x,y,z_m)$, or can fall in between two values of the depth-dependent psf, $h(x,y,z_m)$, and $h(x,y,z_n)$, where m and n correspond to two depth positions at which the psf has been characterized. In one arrangement, the mean square errors (MSE) between the psf estimate and each of the candidate values of the depth-dependent psf are computed as follows:

$$MSE_{k,m} = \sum_{i,j} \left(\hat{h}_k(i, j) - h(i, j, z_m)\right)^2 \quad (6a)$$

$$MSE_{k,n} = \sum_{i,j} \left(\hat{h}_k(i, j) - h(i, j, z_n)\right)^2 \quad (6b)$$

Here the spatial coordinates x, y have been replaced by pixel indices i, j which refer to the discretely sampled pixel locations in the image, and the sums are carried out over the $k^{th}$ block. Using Eqs. (6a) and (6b), the psf value for the $k^{th}$ block is given by:

$$h_k(x, y) = \begin{cases} h(x, y, z_m) & \text{if } MSE_{k,m} < MSE_{k,n} \\ h(x, y, z_n) & \text{if } MSE_{k,n} < MSE_{k,m} \end{cases} \quad (7)$$

Figure 7:
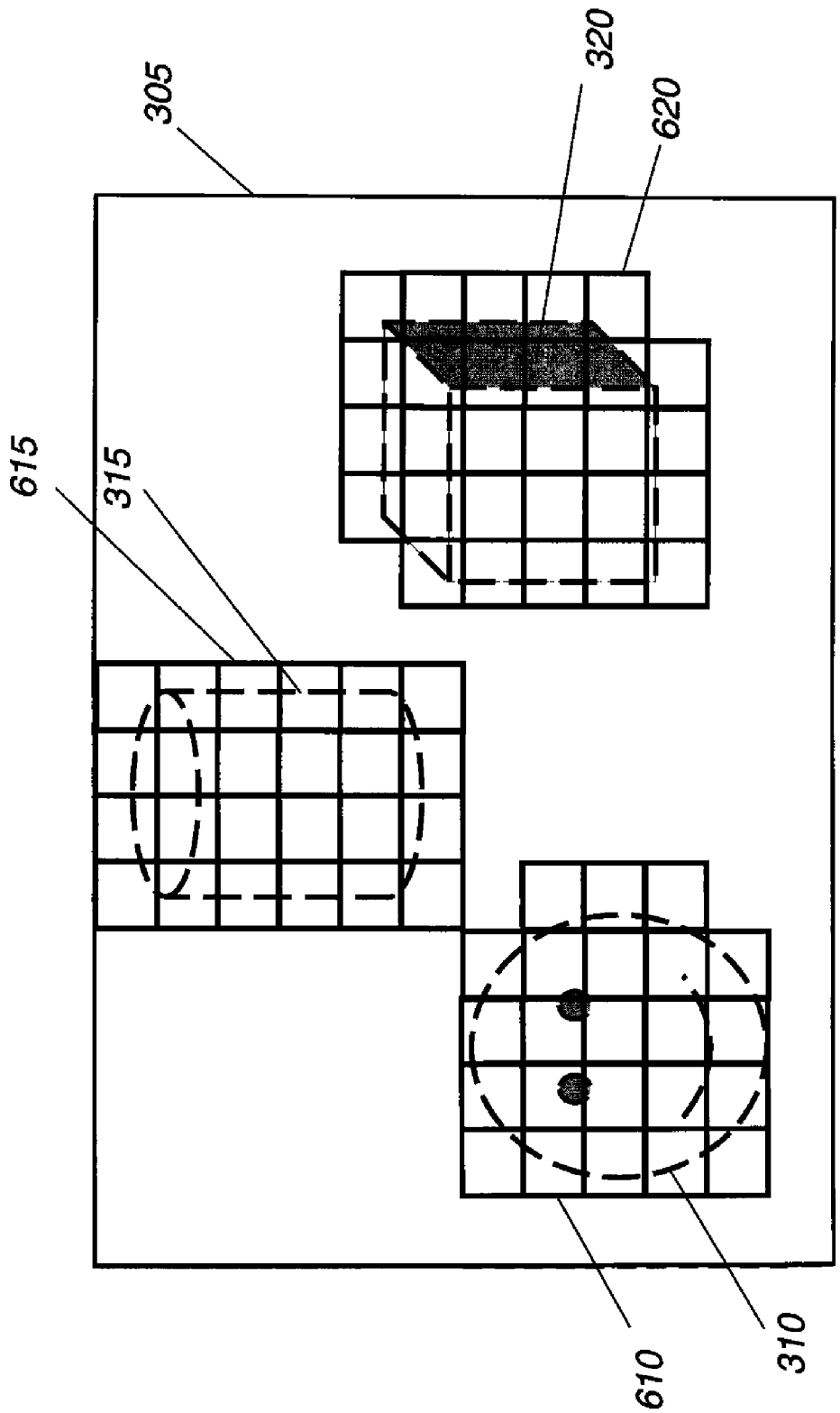
FIG. 7 is a schematic illustrating the combination of contiguous blocks in accordance with their psf values, according to one arrangement of the present invention.

Once the psf values have been assigned for each block in the image, contiguous blocks are combined according to their psf values 600. This means that adjoining blocks having the same psf value are combined into groups. Since the psf varies slowly within the boundaries of scene objects as compared to between scene objects, the groups of similar psfs tend to cluster around and overlay the individual scene objects. This is illustrated in FIG. 7, where group 610 is comprised of blocks having psf value $h_1(x,y)$, group 615 is comprised of blocks having psf value $h_2(x,y)$, and group 620 is comprised of blocks having psf value $h_3(x,y)$. From the previous discussion, the psf values $h_1(x,y)$, $h_2(x,y)$, and $h_3(x,y)$ correspond to the values of the depth-dependent psf $h(x,y,z_1)$, $h(x,y,z_2)$, and $h(x,y,z_3)$, respectively, associated with objects 310, 315 and 320.

Note that in FIG. 7, the blocks are shown to be somewhat large for purposes of illustration, so that a large fraction of blocks in each group are partially occupied by the image objects, in particular around the objects' perimeters. This need not be the case, and a large block size will decrease the spatial resolution of the resulting depth map. Blocks that fall on the perimeter of objects will produce psf values that are an average of the psf operative at the depth of the object, and the psf operative outside the object's occlusion boundary, which can be near to the object or far from the object, depending on the local depth variations. Thus is it expected that the blocks that fall on object occlusion boundaries will yield a less accurate psf value. With a proper choice of block size, this will not greatly affect the accuracy of the final range map.

With the psf values and groupings determined, one can correlate each psf value with the measured data that describes the depth dependent psf of the camera system, which in turn is dominated by the coded aperture mask. The psf dependence on defocus then leads directly to a range map estimate. However, it is an object of the present invention to proceed through additional steps, which when executed, lead to an improved range map. This is useful because the psf values, formed over local regions in the captured image, are affected by noise in the capture process, as well as statistical estimation error, depending on the size of the blocks chosen.

The step of producing blur parameters 700 refers to forming a representation of the psf $h_k(x,y)$ for each grouping of index k. Producing the blur parameters 700 includes forming a digitized representation of the psf, specified by discrete code values in a two dimensional matrix. It also includes deriving mathematical parameters from a regression or curve fitting analysis that has been applied to the psf data, such that the psf values for a given pixel location are readily computed from the parameters and the known regression or fitting function. The blur parameters [$psf_1$, $psf_2$, ... $psf_m$] can be stored inside the camera in a memory 230, along with the measured psf data [$p_1$, $p_2$, ... $p_n$]. Such memory can include computer disk, ROM, RAM or any other electronic memory known in the art. Such memory can reside inside the camera, or in a computer or other device electronically linked to the camera.

In some arrangements, blur parameters are formed for each grouping of index k and all remaining individual blocks, i.e. each block in the image. It may be of interest to obtain a range estimate for each and every block in the image, depending on the resolution desired and the variations of the depth across the x,y plane. In other arrangements, certain blocks or groupings may be deemed of higher interest, so that one or more blocks not assigned to groupings are not assigned blur parameters. For example, referring to FIG. 7, it can be expedient to assign blur parameters only to the blocks within the groups 610, 615 and 620, while omitting this processing step for all other image blocks. In other arrangements, blur parameters can be assigned to selected groups, using the methods described above, and then the parameters for other groups or blocks can be interpolated from the selected groups. This is especially valuable when, as can be determined from the initial psf estimates, the scene depth varies slowly over certain areas. The interpolation of blur parameters is done using the values known from neighboring groups or blocks, using methods known in the art, including but not limited to linear, polynomial, one-dimensional and two-dimensional fitting.

Figure 8:
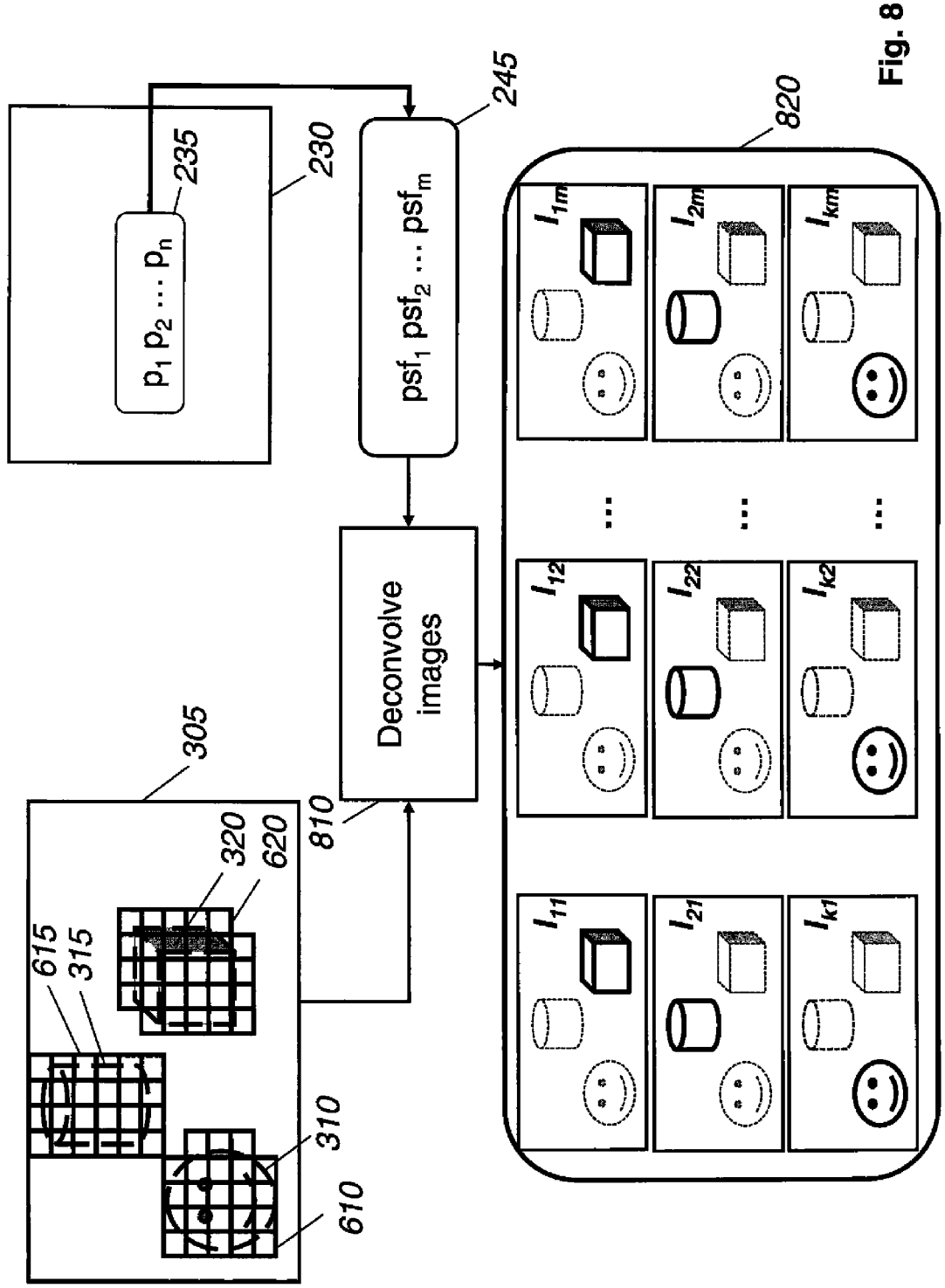
FIG. 8 is a flow chart showing the steps of a method for producing a set of deblurred images according to one arrangement of the present invention.

Returning to FIG. 3, the blur parameters 235 and block groupings are used to produce a set of deblurred images 800. The blur parameters must be transformed into a discrete representation of the local psf that is used for deblurring. In some arrangements, the blur parameters are stored in that form. With reference to FIG. 8, a digital representation of the point spread functions 245 that span the groups in the image are computed from the blur parameters, represented in FIG. 8 as the set [$psf_1$, $psf_2$, ... $psf_m$]. In FIG. 8, there are a total of 3 groups, namely groups 610, 615 and 620. In one arrangement, there is a one-to-one correspondence between the blur parameters 235 and the set of digitally represented psfs 245. In other arrangements, there is not a one-to-one correspondence. In some arrangements, digitally represented psfs at defocus distances for which blur parameter data has not been recorded is computed by interpolating or extrapolating blur parameter data from defocus distances for which blur parameter data is available.

The digitally represented psfs 245 are used in a deconvolution operation 810 to provide a set of deblurred images 820. The captured image 305 is deconvolved K×M times, once for each of the K groups in the image 305, and once for each of the M digitally represented psfs, to create a set of deblurred images 820. The deblurred image set 820, whose elements are denoted [$I_{11}$, $I_{12}$, ... $I_{KM}$], is then further processed with reference to the original captured image 305, to determine the range information 900 for the objects in the scene.

Any method of deconvolution is used in step 810 to create the set of deblurred images 820. In one arrangement, the method of deconvolution described in previously U.S. patent application Ser. No. 12/612,135 entitled "Image deblurring using a combined differential image" is applied. This is an iterative algorithm in which a candidate deblurred image, initially set to the captured image 305, is deblurred in steps, and compared to a reference image until an error criterion is met. Other methods known in the art include the Wiener and Richardson Lucy methods.

In some arrangements employing iterative deblurring algorithms, where the captured image 305 is part of an image sequence, a difference image is computed between the current and previous captured images in the image sequence. If the difference between successive images in the sequence is currently small, the iterative deblurring algorithm for the current image in the sequence can begin with the last iteration of the deblurred image from the previous frame in the image sequence. In some arrangement, this deblurred image can be saved and the deblurring step omitted until a significant difference in the captured image sequence is detected. In some arrangements, selected regions of the current captured image are deblurred, if significant changes in the captured image sequence are detected in these regions. In other arrangements, the range information is determined for selected regions or objects in the scene where a significant difference in the sequence is detected, thus saving processing time.

Figure 9:
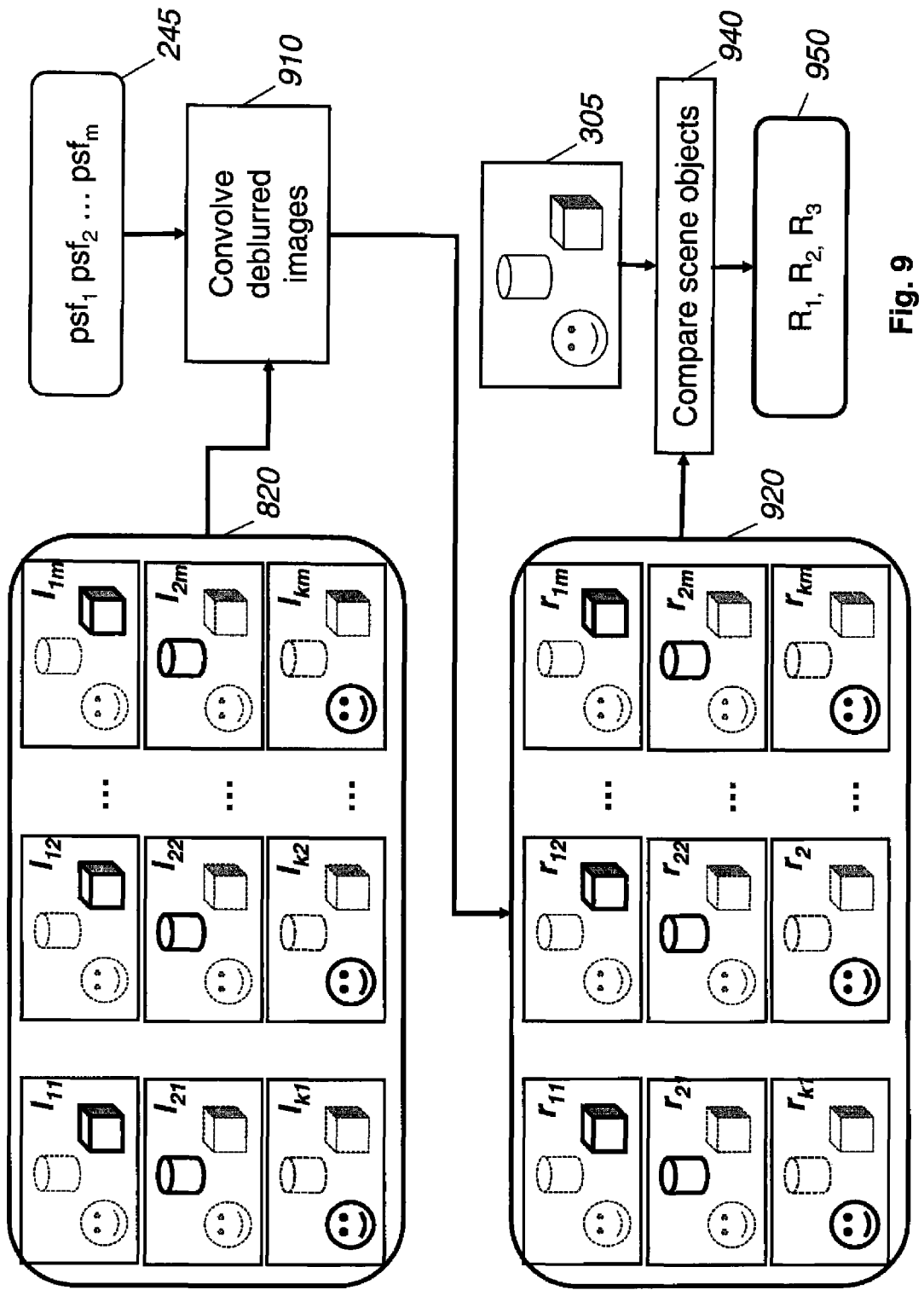
FIG. 9 is a flow chart showing the steps of a method for using the set of deblurred images to determine the range information for objects in the scene, according to one arrangement of the present invention.

FIG. 9 shows a process diagram in which the deblurred image set 820 is processed to determine the range information 950 for the objects in the scene, in one arrangement of the present invention. In this arrangement, a Convolve Deblurred Images step 910 is used to digitally convolve each member [$I_{11}, I_{12}, \ldots I_{KM}$] of the deblurred image set 820 with the corresponding member of the set of digitally represented psfs 245. The Convolve Deblurred Images step 910 uses digital convolution algorithms known in the art. The result is a set of reconstructed images 920, whose elements are denoted [$r_{11}, r_{12}, \ldots r_{KM}$]. In theory, each reconstructed image in the set [$r_{11}, r_{12}, \ldots r_{KM}$] should contain an exact match for one scene object at one depth position in the original captured image 305, since the convolution operation is the inverse of the deblurring, or deconvolution operation that was performed earlier. However, because the deconvolution operation is imperfect, no elements of the resulting reconstructed image set 920 are a perfect match for the captured image 305. However, scene objects reconstruct with higher fidelity when processed with psfs corresponding to a distance that more closely matches the distance of the scene object relative to the plane of camera focus, whereas scene objects processed with psfs that do not match the distance of the scene object relative to the plane of camera focus exhibit poor fidelity and noticeable artifacts. With reference to FIG. 9, by comparing 940 the reconstructed image set 920 with the scene objects in the captured image 305, range values 950 are assigned by finding the closest matches between the scene elements in the captured image 305 and the reconstructed versions of those elements in the reconstructed image set 920. For example, scene objects 310, 315, and 320 in the captured image 305 are compared 940 to their reconstructed versions in each element [$r_{11}, r_{12}, \ldots r_{KM}$] of the reconstructed image set 920, and assigned range values 950 of $R_1$, $R_2$, and $R_3$ that correspond to the known distances associated with the corresponding psfs that yield the closest matches.

The deblurred image set 820 can be limited by using a subset of blur parameters from the stored set 245. This permits reduction of the processing time needed to deblur the images and to assign the range values. The set of blur parameters used (and hence the deblurred image set 820 created) is limited in increment (i.e. sub-sampled) or extent (i.e. restricted in range). If a digital image sequence is processed, the set of blur parameters used is the same, or different for each image in the sequence.

Alternatively, instead of sub-setting or sub-sampling the blur parameters from the stored set, a reduced deblurred image set is created by combining images corresponding to range values within selected range intervals. This might be done to improve the precision of depth estimates in a highly textured or highly complex scene which is difficult to segment. For example, let $z_m$, where m=1, 2, ... M denote the set of range values at which the psf data 245 and corresponding blur parameters have been measured. Let $I_{km}(x,y)$ denote the deblurred image corresponding to group k at range value m, and let $\tilde{I}_{km}(V_x,V_y)$ denote its Fourier transform. For example, if the range values are divided into M equal intervals, each containing N range values, a reduced deblurred image set for the kth group is defined as:

$$I_{red} = \left\{ \frac{1}{N}\sum_{m=1}^{N} I_{km}(x, y); \frac{1}{N}\sum_{m=N+1}^{2N} I_{km}(x, y); \right.$$
$$\left. \frac{1}{N}\sum_{m=2N+1}^{3N} I_{km}(x, y); \ldots \frac{1}{N}\sum_{m=(N/M)-N}^{N/M} I_{km}(x, y); \right\} \quad (14)$$

In other arrangements, the range values are divided into M unequal groups. In another arrangement, a reduced blurred image set is defined by writing Eq. (14) in the Fourier domain and taking the inverse Fourier transform. In yet another arrangement, a reduced blurred image set is defined for the kth group, using a spatial frequency dependent weighting criterion. In one arrangement this is computed in the Fourier domain using an equation such as:

$$\tilde{I}_{red} = \left\{ \frac{1}{N}\sum_{m=1}^{N} w(v_x, v_y)\tilde{I}_{km}(v_x, v_y); \frac{1}{N}\sum_{m=N+1}^{2N} w(v_x, v_y)\tilde{I}_{km}(v_x, v_y); \right.$$
$$\left. \ldots \frac{1}{N}\sum_{m=(N/M)-N}^{N/M} w(v_x, v_y)\tilde{I}_{km}(v_x, v_y); \right\} \quad (15)$$

where $w(V_x,V_y)$ is a spatial frequency weighting function. Such a weighting function is useful, for example, in emphasizing spatial frequency intervals where the signal-to-noise ratio is most favorable, or where the spatial frequencies are most visible to the human observer. In some arrangements, the spatial frequency weighting function is the same for each of the M range intervals; however, in other arrangements, the spatial frequency weighting function is different for some of the intervals.

Figure 10:
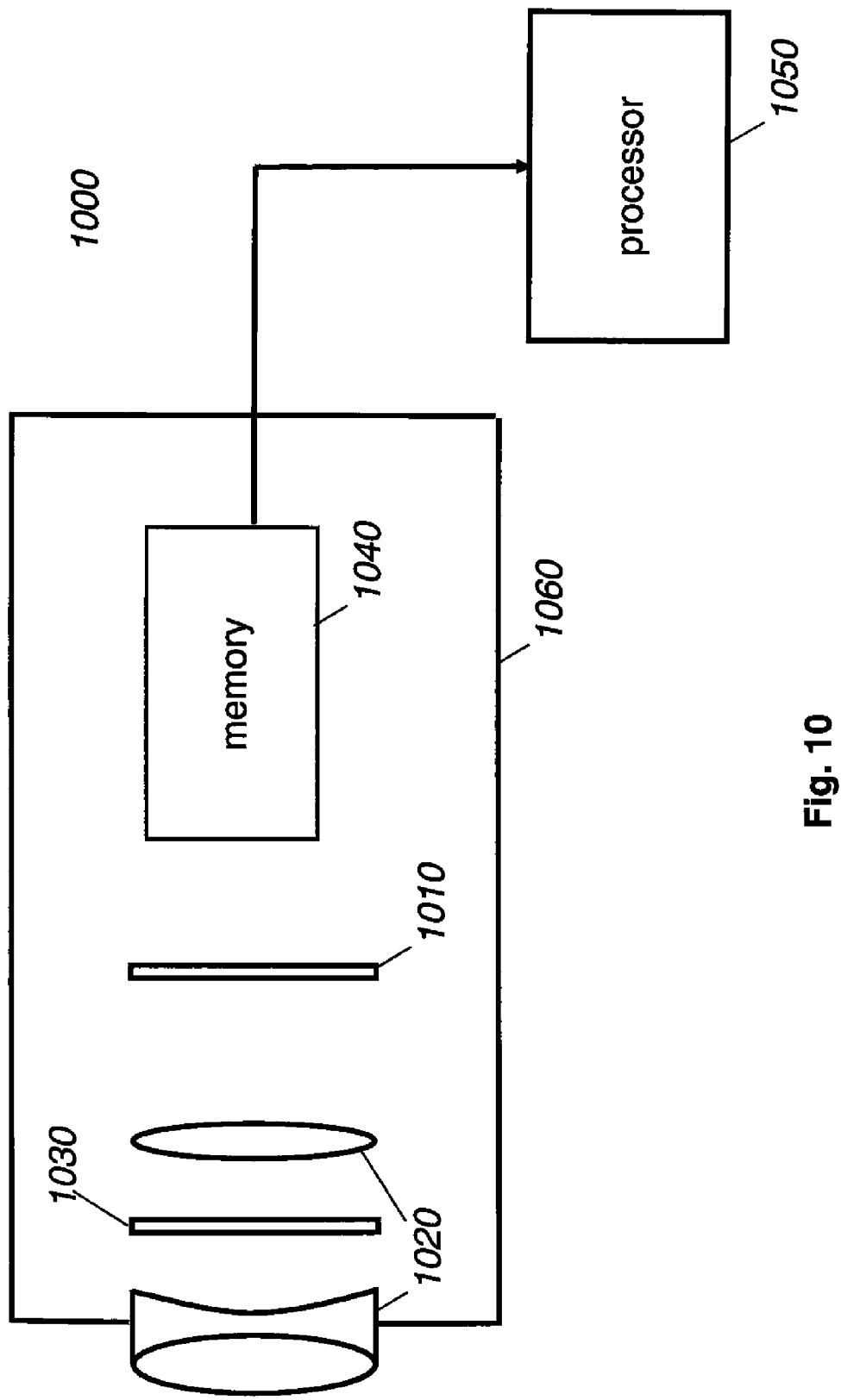
FIG. 10 is a schematic of a digital camera system according to one embodiment of the present invention.

FIG. 10 is a schematic of a digital camera system 1000 in accordance with the present invention. The system includes an objective lens 1020, coded aperture 1030 and image sensor 1010 for capturing one or more images of a scene. Also included is a processor-accessible memory 1040 for storing a set of blur parameters derived from range calibration data. These components are located inside an enclosure 1060. The system also includes a processor 1050 in communication with the other components, for dividing the captured image into a set of blocks, assigning a point spread function (psf) value to each of the blocks, combining contiguous blocks in accordance with their psf values, producing a set of blur parameters based upon the psf values of the combined blocks and the psf values of the remaining blocks, producing a set of deblurred images based upon the captured image and each of the blur parameters, and using the set of deblurred images to determine the range information for the objects in the scene. The data processing system 1050 is a programmable digital computer that executes the steps previously described for providing a set of deblurred images using captured images and using the set of deblurred images to determine the range information for the objects in the scene. Further, the data processing system 1050 controls the image capture device, and can control other processing of the captured images.

The invention has been described in detail with particular reference to certain preferred embodiments thereof, but it will be understood that variations and modifications is effected within the spirit and scope of the invention.

PARTS LIST

| | |
|---|---|
| $s_1$ | Distance |
| $s_2$ | Distance |
| $s_1'$ | Distance |
| $s_2'$ | Image Distance |
| $P_1$ | On-Axis Point |
| $P_2$ | On-Axis Point |
| $P_1'$ | Image Point |
| $P_2'$ | Image Point |
| A | Axial Image Point |
| $A_1$ | Axial Image Point |
| $A_2$ | Axial Image Point |
| $B_{1,6}$ | Image block |
| $B_{2,7}$ | Image block |
| $B_{5,8}$ | Image block |
| $B_{6,9}$ | Image block |
| D | Clear Aperture Diameter |
| d | Blur Circle Diameter |
| F | Focal Plane |
| $R_0$ | Object Distance |
| $D_1$ | Planes |
| $D_2$ | Planes |
| $O_1, O_2, O_3$ | Scene Elements |
| $p_1, p_2, \ldots p_n$ | Measured psf Data |
| $psf_1, psf_2, \ldots psf_m$ | Blur Parameters |
| $R_1, R_2, R_3$ | Range Values |
| $[I_{11}, I_{12}, \ldots I_{KM}]$ | Deblurred Image Set Elements |
| $[r_{11}, r_{12}, \ldots r_{KM}]$ | Reconstructed Image Set Elements |
| 10 | Lens |
| 20 | Axial ray |
| 22 | Axial ray |
| 24 | Axial ray |
| 26 | Axial ray |
| 30 | Lens |
| 32 | Binary transmittance mask |
| 34 | Lens |
| 200 | Provide image capture device step |
| 205 | Light source |
| 210 | Image capture device |
| 215 | Objective lens |
| 220 | Coded Aperture |
| 225 | Electronic sensor array |
| 230 | Memory |
| 235 | Measured psf data |
| 245 | Digital point spread functions |
| 250 | Condenser optics |
| 255 | Light ray |
| 260 | Light ray |
| 265 | Light source |
| 300 | Capture image step |
| 305 | Captured image |
| 310 | Scene object |
| 315 | Scene object |
| 320 | Scene object |
| 325 | Matrix of image blocks |
| 400 | Divide image into blocks step |
| 500 | Assign PSF values step |
| 600 | Combine contiguous blocks step |
| 610 | Group of image blocks |
| 615 | Group of image blocks |
| 620 | Group of image blocks |
| 700 | Produce blur parameters step |
| 800 | Produce deblurred images step |
| 810 | Deconvolve images step |
| 820 | Deblurred images |
| 900 | Determine range information step |

-continued

PARTS LIST

| | |
|---|---|
| 910 | Convolve deblurred images step |
| 920 | Reconstructed images |
| 940 | Compare scene objects step |
| 950 | Range information |
| 1000 | Digital camera system |
| 1010 | Image sensor |
| 1020 | Objective lens |
| 1030 | Coded aperture |
| 1040 | Memory |
| 1050 | Processor |
| 1060 | Enclosure |

The invention claimed is:

1. A method, comprising:
   obtaining a digital image of a scene that includes a plurality of objects, the digital image obtained by an image capture device through a coded aperture;
   segmenting the digital image into a plurality of blocks;
   determining a point spread function (psf) value for each of the blocks;
   grouping contiguous blocks having related psf values; and
   determining a distance between the image capture device and one or more of the plurality of objects based, at least in part, on a relation between the psf values of the grouped blocks and a measured depth dependency of psf values of the image capture device.

2. The method of claim 1, wherein the step of determining a distance between the image capture device and one or more of the plurality of objects further includes:
   producing a set of blur parameters based upon the psf values of the grouped blocks and the psf values of non-grouped blocks;
   producing a set of deblurred images based upon the obtained digital image and each of the blur parameters; and
   determining the distance between the image capture device and one or more of the plurality of objects based, at least in part, on using the set of deblurred images.

3. The method of claim 1, wherein the step of determining a psf value for each of the blocks further includes:
   measuring the psf of the image capture device at a series of object and image defocus positions;
   forming an initial psf estimate for each block in the captured image;
   comparing the initial psf estimates to the measured psf of the image capture device; and
   determining a psf value for each block in the captured image based, at least in part, on the comparison.

4. The method of claim 3, wherein the initial psf estimate is formed using a frequency content or sharpness metric.

5. The method of claim 3, wherein the initial psf estimate is formed using edge detection and edge gradient analysis.

6. The method of claim 1, wherein the step of obtaining a digital image of a scene further includes obtaining a sequence of digital images of the scene.

7. The method of claim 6, wherein the step of determining a distance between the image capture device and one or more of the plurality of objects further includes determining at least one distance for each image in the sequence.

8. A digital camera system comprising:
   an image capture device for capturing one or more images of a scene, each image including a plurality of objects, the image capture device comprising:
   an image sensor;
   a lens for imaging the scene onto the image sensor;

a coded aperture; and a processor-accessible memory; and a data processing system coupled to the image capture device for obtaining one of the one or more images of the scene;

segmenting the obtained image into a plurality of blocks;

determining a point spread function (psf) value for each of the blocks;

grouping contiguous blocks having related psf values; and determining a distance between the image capture device and one or more of the plurality of objects in the obtained image based, at least in part, on a relation between the psf values of the grouped blocks and a measured depth dependency of psf values of the image capture device.

9. The digital camera system of claim 8, wherein the step of determining the distance between the image capture device and one or more of the plurality of objects further includes:

producing a set of blur parameters based upon the psf values of the grouped blocks and the psf values of non-grouped blocks;

producing a set of deblurred images based upon the obtained digital image and each of the blur parameters; and determining the distance between the image capture device and one or more of the plurality of objects based, at least in part, on using the set of deblurred images.

10. The digital camera system of claim 8, wherein the step of determining the psf value for each of the blocks further includes:

measuring the psf of the image capture device at a series of object and image defocus positions;

forming an initial psf estimate for each block in the captured image;

comparing the initial psf estimates to the measured psf of the image capture device; and determining a psf value for each block in the obtained image based, at least in part, on the comparison.

11. The digital camera system of claim 10, wherein the initial psf estimate is formed using a frequency content or sharpness metric.

12. The digital camera system of claim 10, wherein the initial psf estimate is formed using edge detection and edge gradient analysis.

13. The digital camera system of claim 8, wherein the step of obtaining one of the one or more images of the scene further includes obtaining a plurality of images of the scene captured by the image capture device.

14. The digital camera system of claim 13, wherein the step of determining the distance between the image capture device and one or more of the plurality of objects further includes determining at least one distance for each image in the obtained plurality of images of the scene captured by the image capture device.

15. A non-transitory processor-accessible memory device, readable by a programmable digital computer and comprising instructions stored thereon to cause the programmable digital computer to perform a method, comprising:

obtaining a digital image of a scene that includes a plurality of objects, the digital image obtained by an image capture device through a coded aperture;

segmenting the digital image into a plurality of blocks;

determining a point spread function (psf) value for each of the blocks;

grouping contiguous blocks having related psf values; and determining a distance between the image capture device and one or more of the plurality of objects based, at least in part, on a relation between the psf values of the grouped blocks and a measured depth dependency of psf values of the image capture device.

16. The non-transitory processor-accessible memory device of claim 15, wherein the step of determining a distance between the image capture device and one or more of the plurality of objects further includes:

producing a set of blur parameters based upon the psf values of the grouped blocks and the psf values of non-grouped blocks;

producing a set of deblurred images based upon the obtained digital image and each of the blur parameters; and determining the distance between the image capture device and the one or more of the plurality of objects based, at least in part, on using the set of deblurred images.

17. The non-transitory processor-accessible memory device of claim 15, wherein the step of determining the psf value for each of the blocks further includes:

measuring the psf of the image capture device at a series of object and image defocus positions;

forming an initial psf estimate for each block in the captured image;

comparing the initial psf estimates to the measured psf of the image capture device; and determining a psf value for each block in the captured image based, at least in part, on the comparison.

18. The non-transitory processor-accessible memory device of claim 16, wherein the initial psf estimate is formed using a frequency content or sharpness metric.

19. The non-transitory processor-accessible memory device of claim 16, wherein the initial psf estimate is formed using edge detection and edge gradient analysis.

20. The non-transitory processor-accessible memory device of claim 15, wherein the step of obtaining a digital image of a scene further includes obtaining a sequence of digital images obtained by the image capture device, and wherein the step of determining a distance between the image capture device and one or more of the plurality of objects further includes determining at least one distance for each image in the sequence.

* * * * *

UNITED STATES PATENT AND TRADEMARK OFFICE
CERTIFICATE OF CORRECTION

PATENT NO. : 8,582,820 B2  
APPLICATION NO. : 12/889818  
DATED : November 12, 2013  
INVENTOR(S) : Paul James Kane et al.

Page 1 of 1

It is certified that error appears in the above-identified patent and that said Letters Patent is hereby corrected as shown below:

In the Claims

Column 16, Claim 18, line 2, replace "claim 16" with --claim 17--.

Column 16, Claim 19, line 2, replace "claim 16" with --claim 17--.

Signed and Sealed this  
Fourth Day of February, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,582,820 B2  Page 1 of 1
APPLICATION NO. : 12/889818
DATED : November 12, 2013
INVENTOR(S) : Paul James Kane et al.

It is certified that error appears in the above-identified patent and that said Letters Patent is hereby corrected as shown below:

In the Claims

Column 16, Claim 18, line 42, replace "claim 16" with --claim 17--.

Column 16, Claim 19, line 45, replace "claim 16" with --claim 17--.

This certificate supersedes the Certificate of Correction issued February 4, 2014.

Signed and Sealed this
Twenty-fifth Day of February, 2014

Michelle K. Lee
*Deputy Director of the United States Patent and Trademark Office*